United States Patent
Kleihorst

(12)
(10) Patent No.: US 6,349,154 B1
(45) Date of Patent: Feb. 19, 2002

(54) METHOD AND ARRANGEMENT FOR CREATING A HIGH-RESOLUTION STILL PICTURE

(75) Inventor: Richard P. Kleihorst, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/216,266

(22) Filed: Dec. 18, 1998

(30) Foreign Application Priority Data

Dec. 22, 1997 (NL) ............................................ 97204055

(51) Int. Cl.[7] ................................................ G06K 9/48
(52) U.S. Cl. ........................ 382/299; 345/698; 345/699; 382/236; 382/238
(58) Field of Search ................................. 382/299, 298, 382/238, 236, 235, 284, 248, 107; 348/400.1, 415.1; 345/698, 699

(56) References Cited

U.S. PATENT DOCUMENTS

| | | | | |
|---|---|---|---|---|
| 5,748,787 A | * | 5/1998 | Sugiyama | .................... 382/240 |
| 5,825,927 A | * | 10/1998 | Boyce et al. | ................ 382/232 |
| 5,930,405 A | * | 7/1999 | Chida | .......................... 382/284 |
| 5,943,445 A | * | 8/1999 | Dufaux | ........................ 382/236 |
| 6,005,690 A | * | 12/1999 | Suzuki et al. | ................ 358/527 |
| 6,023,535 A | * | 2/2000 | Aoki | ............................ 382/299 |
| 6,091,855 A | * | 7/2000 | Hosaka et al. | .............. 382/240 |

FOREIGN PATENT DOCUMENTS

EP       0731600 A2    9/1996    ............ H04N/5/14

* cited by examiner

*Primary Examiner*—Bhavesh Mehta
*Assistant Examiner*—Yosef Kassa
(74) *Attorney, Agent, or Firm*—Russell Gross

(57) ABSTRACT

A method and arrangement is disclosed for creating a high-resolution still picture. A sequence of lower-resolution pictures is subjected to motion-compensated predictive encoding, preferably by an MPEG encoder producing an IPPP. sequence of encoded pictures. The relatively small differences between successive pictures, which are due to motion of the image sensor or motion in the scene, become manifest in motion vectors with sub-pixel accuracy. The high-resolution picture is then created from the decoded pictures and the motion vectors generated by the encoder. The invention is particularly applicable in electronic still picture cameras with a storage medium. The MPEG encoder takes care of data compression, and the decoder also allows playback of the original moving video sequence.

10 Claims, 4 Drawing Sheets

METHOD AND ARRANGEMENT FOR CREATING A HIGH-RESOLUTION STILL PICTURE

FIELD OF THE INVENTION

The invention relates to a method of creating a high-resolution still picture, comprising the steps of: receiving a sequence of lower-resolution pictures; estimating motion in said sequence of lower-resolution pictures with sub-pixel accuracy; and creating the high-resolution still picture from said sequence of lower-resolution pictures and said estimated motion. The invention also relates to an arrangement for creating a high-resolution still picture, for example, an electronic still-picture camera.

BACKGROUND OF THE INVENTION

A prior-art method of creating a high-resolution still picture as defined in the opening paragraph is disclosed in European Patent Application EP-A-0 731 600. In this prior-art method, one of the lower resolution pictures is selected as a reference picture, and the relative motion between the pixels of the reference picture and each one of the other pictures is estimated with sub-pixel accuracy. Using the motion thus estimated, the lower resolution pictures are scaled to the high-resolution domain and combined to form the high-resolution picture. The relative motion is represented in the form of a mapping transform.

OBJECT AND SUMMARY OF THE INVENTION

It is an object of the invention to provide a method of creating still pictures with advantageous effects in terms of performance and practical implementations.

To this end, the method in accordance with the invention comprises the steps of subjecting the sequence of pictures to motion-compensated predictive encoding, thereby generating motion vectors representing motion between successive pictures of said sequence; decoding said encoded pictures; and creating the high-resolution picture from said decoded pictures and the motion vectors generated in said encoding step.

The creation of a high-resolution picture from a sequence of lower-resolution pictures relies on the availability of sub-pixel motion information. Employing motion-compensated predictive encoding based on motion between successive pictures (instead of motion between each picture and a fixed reference picture) increases the probability that motion vectors with sub-pixel accuracy will be obtained. The performance of the method is thus considerably improved. The invention also has the advantage that the sequence of motion-compensated predictively encoded lower-resolution pictures is a compressed representation of the high-resolution still picture. Accordingly, the still picture can efficiently be stored and/or transmitted. Because the motion vectors are part of the stored data, the high-resolution still picture can then be obtained without necessitating another motion estimator. A further advantage is that, upon reproduction, the user may select creation of the high-resolution still picture or playback of the original lower-resolution video sequence.

Preferably, the step of encoding the sequence of pictures comprises the use of an MPEG encoder which is arranged to produce an IPPP. sequence of encoded pictures. Cost-effective MPEG encoders with high compression ratios are readily available.

In an embodiment of the invention, the high-resolution still picture is created by recursively adding a current decoded picture to a previously created picture, said previously created picture being subjected to motion-compensation in accordance with the motion vector which is associated with the current decoded picture. It is thereby achieved that the still picture is gradually built-up in a single picture memory.

The invention can also be used to create a high-resolution still picture from an already available (received or recorded) sequence of motion-compensated predictively encoded lower-resolution pictures, for example, an MPEG bitstream.

DESCRIPTION OF EMBODIMENTS

Figure 1:
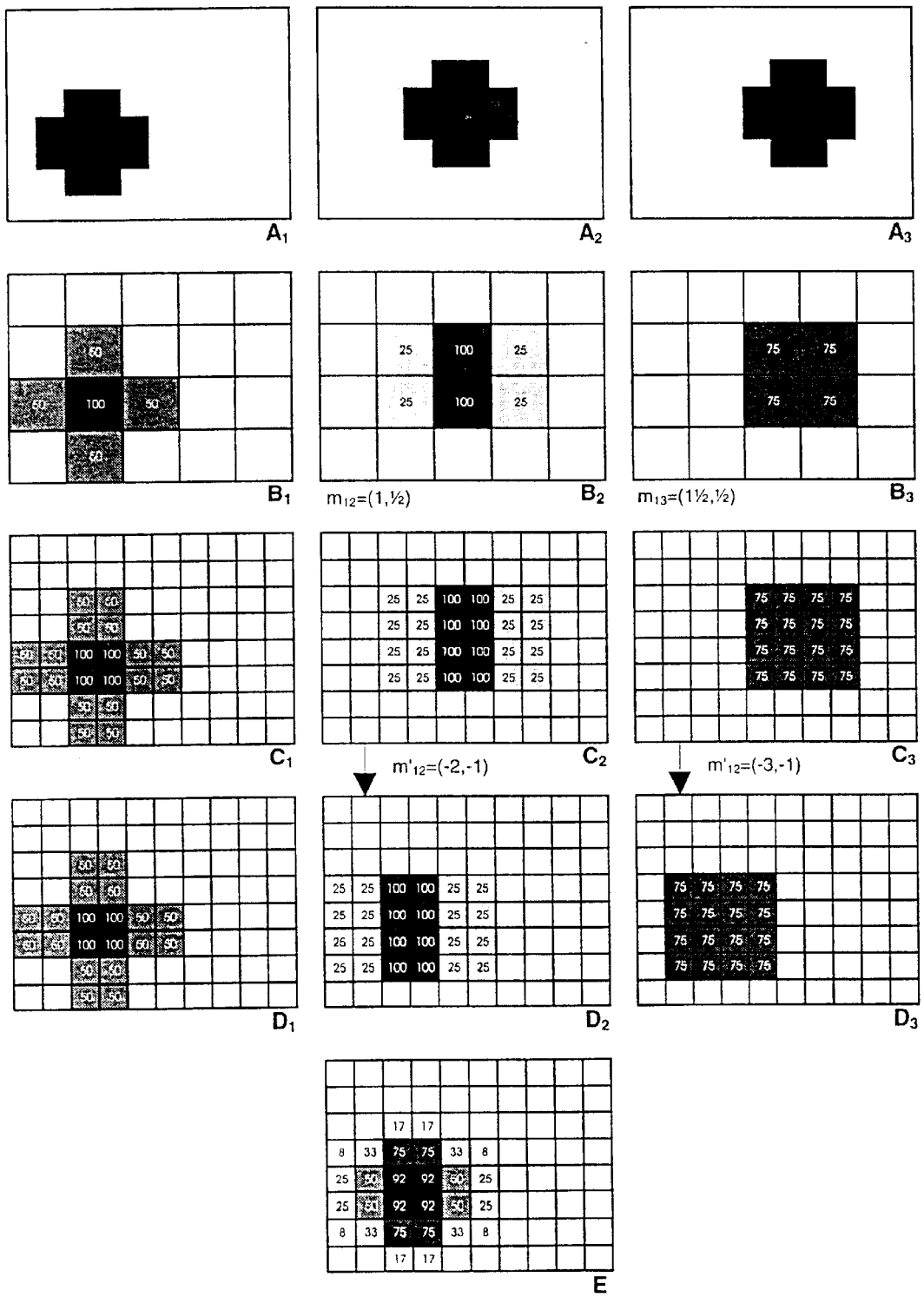
FIG. 1 shows various pictures to illustrate the prior art method of creating a high-resolution picture.

FIG. 1 shows various pictures to illustrate the prior art method of creating a high-resolution picture. In this Figure, the pictures $A_1$, $A_2$ and $A_3$ show three successive phases of a moving object. The pictures $B_1$, $B_2$ and $B_3$ denote the corresponding pixel values on a low-resolution grid as generated by a low-resolution image sensor. Throughout this description, pixels will have a value in the range 0–100, the value 0 not being shown in the various picture diagrams.

In the prior art, amounts of motion are calculated between the pixels of a fixed reference picture and each one of the subsequent pictures. In the example shown in FIG. 1, picture $B_1$ is the reference picture. To simplify the example, it is assumed that all pixels of the object have the same amount of motion, so that a single motion vector is obtained for each subsequent picture. Accordingly, motion vector $m_{12}$ represents the amount of motion between pictures $B_1$ and $B_2$. The vector is assumed to have the value $m_{12}=(1,½)$, denoting a motion by 1 pixel to the right and ½ pixel upwards. Similarly, the motion vector $m_{13}$ indicates the amount of motion between pictures $B_1$ and $B_3$. This vector is assumed to have the value $m_{13}=(1½,½)$.

The pictures $C_1$, $C_2$ and $C_3$ are the respective versions of pictures $B_1$, $B_2$ and $B_3$ on the high-resolution grid. They are obtained by up-sampling. In this example, in which the motion estimation is carried out at half-pixel accuracy, the high resolution is twice the low resolution in both the horizontal and the vertical direction. The up-sampling is carried out by repeating each pixel four times.

The pictures $D_1$, $D_2$ and $D_3$ are the pictures obtained by moving back the pictures $C_1$, $C_2$ and $C_3$ through a distance corresponding to their motion vectors. The respective motion vectors $m'_{12}$ and $m'_{13}$ in the high-resolution domain are obtained by multiplying the original motion vectors $m_{12}$ and $m_{13}$ in the low-resolution domain by the resolution enhancement factor –2. Thus, picture $C_2$ is shifted 2 pixels to the left and 1 pixel downwards, and picture $C_3$ is shifted 3 pixels to the left and 1 pixel downwards.

Finally, picture E is the result of adding together the pictures $D_1$, $D_2$ and $D_3$, and dividing the sum by 3 (the number of pictures). As can be seen, picture E starts to reveal high-resolution details of the original object. The more further pictures are processed in this manner, the better the resemblance.

Figure 2:
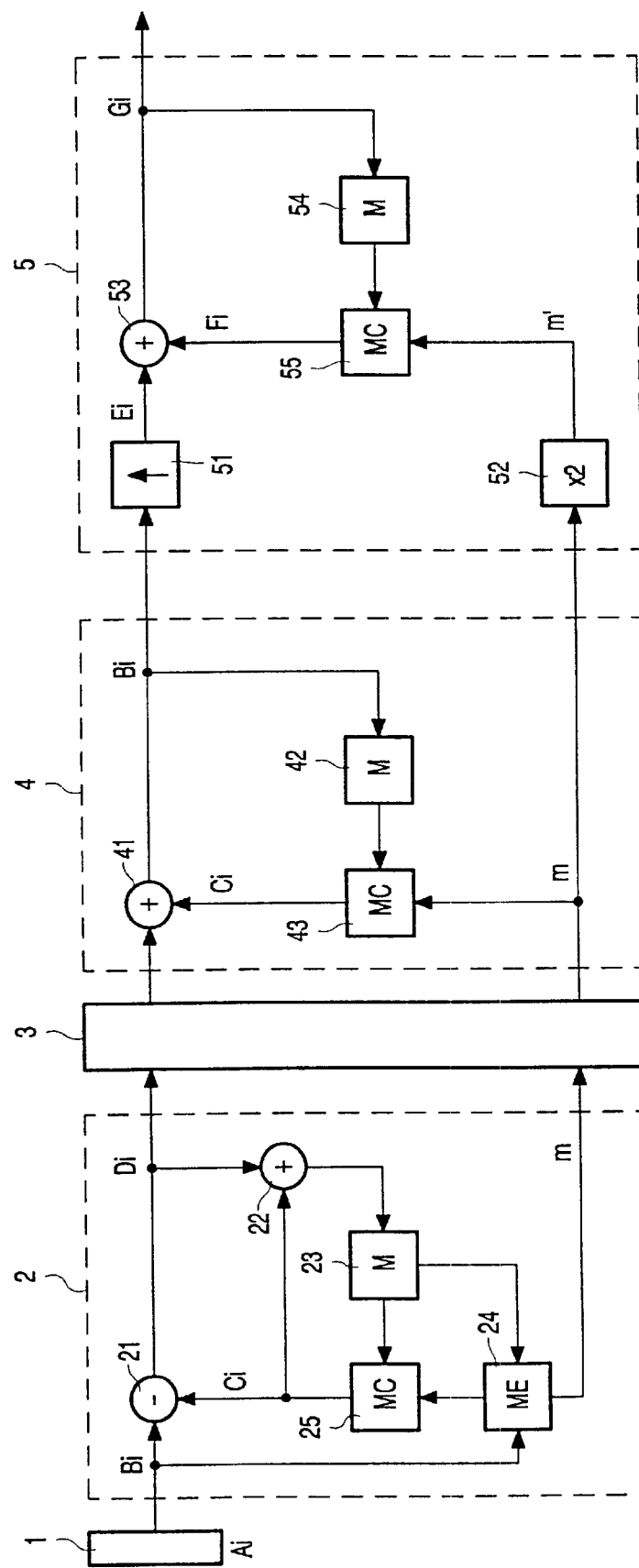
FIG. 2 shows a block diagram of a system carrying out the method of creating a high-resolution picture in accordance with the invention.

FIG. 2 shows a block diagram of a system carrying out the method in accordance with the invention. The system comprises an image sensor 1, a motion-compensated prediction encoder 2, a storage medium (or transmission channel) 3, a motion-compensated prediction decoder 4 and a processing circuit 5 for creating the high-resolution picture. The image sensor receives images $A_i$ corresponding to the pictures $A_1$, $A_2$ and $A_3$ shown in FIG. 1, and generates digitized low-resolution pictures $B_i$ corresponding to the pictures $B_1$, $B_2$ and $B_3$ shown in FIG. 1.

The motion-compensated prediction encoder 2 (preferably a standard MPEG encoder such as the Philips integrated circuit SAA7650) encodes and compresses the pictures in accordance with the MPEG2 coding standard. The encoder comprises a subtracter 21, an adder 22, a frame memory 23, a motion estimator 24 and a motion compensator 25. Elements which are not essential for understanding the invention, such as a discrete cosine transformer, a quantizer and a variable-length encoder have been omitted. The operation of the encoder will briefly be explained with reference to FIG. 3. In this Figure, the input images $A_1$, $A_2$ and $A_3$ and their digital counterparts $B_1$, $B_2$ and $B_3$ are the same as in FIG. 1.

Figure 3:
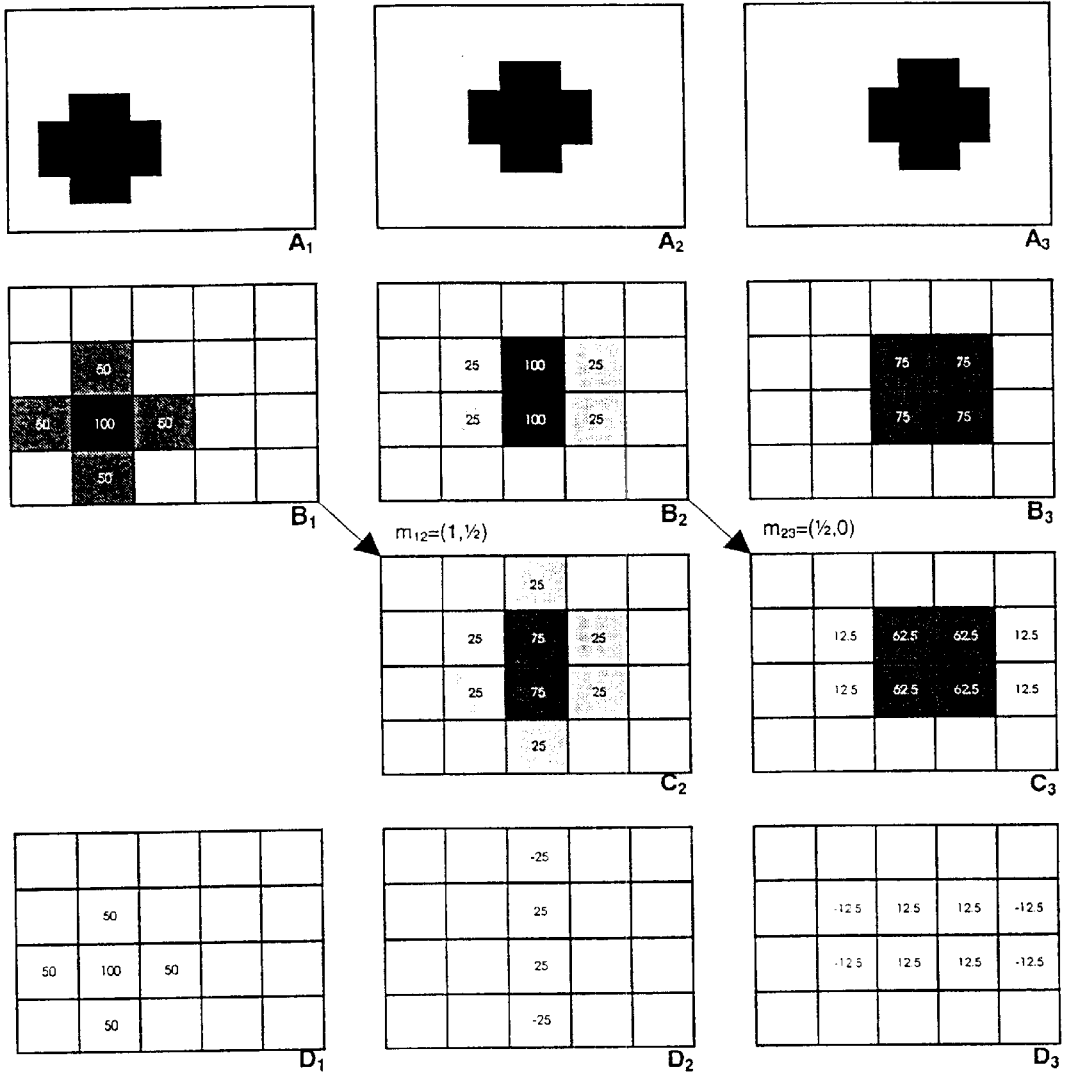
FIGS. 3 and 4 show various pictures to illustrate the operation of the system which is shown in FIG. 2.

The first picture $B_1$ of the sequence is autonomously encoded. In MPEG coding, such a picture is usually referred to as an I-picture. In FIG. 3, picture $D_1$ shows the pixel values of the autonomously encoded picture. The picture is applied to the encoder's output and also stored in the frame memory 23.

The further pictures $B_2$ and $B_3$ are predictively encoded. In MPEG coding, they are usually referred to as P-pictures. To encode these pictures, the motion estimator 24 calculates the amount of motion between the current picture $B_i$ and the stored previously encoded picture $B_{i-1}$. Usually, said motion estimation is carried out on the basis of blocks of 16*16 pixels. Using the calculated motion vector, the motion compensator 25 generates a prediction picture $C_i$ which is subtracted from the picture $B_i$ to be encoded so as to form a difference output picture $D_i$. The prediction image $C_i$ and the encoded difference $D_i$ are added by adder 22 and stored in the frame memory 23.

Picture $C_2$ in FIG. 3 is the motion-compensated prediction picture for encoding the picture $B_2$. As in the prior art, the relevant motion vector $m_{12}$ is assumed to have the value $(1, \frac{1}{2})$. Picture $B_2$ is thus encoded in the form of a difference picture which is shown as $D_2$ in FIG. 3.

Similarly, picture $C_3$ is the motion-compensated prediction picture for encoding the picture $B_3$. Note that the motion vector $m_{23}$ is representative of the amount of motion between pictures $B_2$ and $B_3$. This is in contrast to the prior art in which all motion vectors are calculated with respect to the same reference picture $B_1$. In the present example, motion vector $m_{23}$ has the value $(\frac{1}{2},0)$. Picture $B_3$ is now encoded in the form of difference picture $D_3$.

With reference to FIG. 2 again, the encoded pictures $D_i$ along with the motion vectors m are stored on a storage medium 3 or transmitted through a transmission channel. Subsequently, the original sequence of low-resolution pictures is decoded by the motion-compensated prediction decoder 4. Again, only the most relevant elements of this (MPEG) decoder are shown, i.e. an adder 41, a frame memory 42 and a motion-compensator 43 which receives the motion vectors m as produced by the encoder.

After reconstructing the original low-resolution pictures, the high-resolution still picture is recursively created by the processing circuit 5. As shown in FIG. 2, this processing circuit 5 comprises an up-sampler 51, a multiplier 52, an adder 53, a frame memory 54 and a motion compensator 55.

Figure 4:
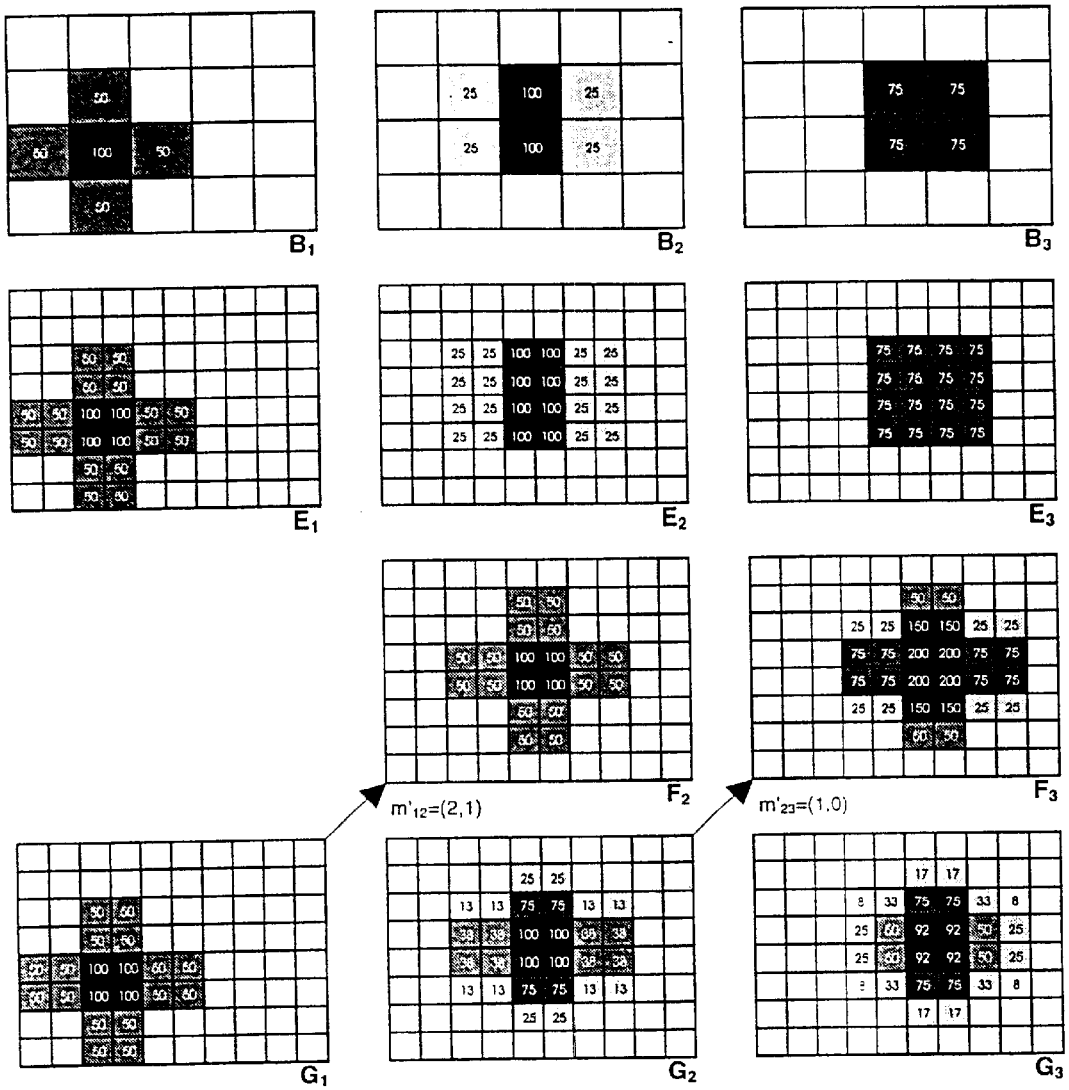

FIG. 4 shows various pictures to illustrate the operation of the processing circuit. The pictures $B_1$, $B_2$ and $B_3$ are the decoded low-resolution pictures supplied by the prediction decoder 4. Apart from artefacts due with the imperfectness of the compression by the encoder, they correspond with the pictures $B_1$, $B_2$ and $B_3$ shown in FIGS. 1 and 3. Pictures $E_1$, $E_2$ and $E_3$ are their versions in the high-resolution domain. They are supplied by up-sampler 51 by pixel repetition.

In a first iteration step, the processing circuit 5 outputs the first high-resolution picture $G_1$ and feeds it into the frame memory 54. Because the first picture is an I-picture, the output picture $G_1$ is the same as input picture $E_1$.

In a second iteration step, the next high-resolution picture $E_2$ and a motion-compensated previous picture $F_2$ are added by adder 53. The motion-compensated picture $F_2$ is obtained by shifting the stored picture $G_1$ two pixels to the right and one pixel upwards in accordance with motion vector $m'_{12} = (2,1)$ which is twice the original motion vector $m_{12}$. Picture $G_2$ is the result of this iteration step. The pixel values shown have been normalized, i.e. divided by 2 which is the number of pictures processed thus far. As can be seen, high-resolution details start to appear in the vertical direction. Details do not yet appear in the horizontal direction because the original motion vector $m_{12}$ has a sub-pixel component in the vertical direction only. The output picture $G_2$ (without the normalization factor being applied) is stored in frame memory 54.

In a third iteration step, the next high-resolution picture $E_3$ and a motion-compensated previous picture $F_3$ are added. The latter is obtained by shifting the stored picture $G_2$ one pixel to the right in accordance with motion vector $m'_{23} = (1,0)$. Picture $G_3$ is the result of this iteration step. The pixel values shown are obtained after division by 3, which is the number of pictures processed thus far. As can be seen, high-resolution details now start to appear also in the horizontal direction, because the original motion vector $m_{23}$ has a sub-pixel component in this direction.

The above described steps are repeated for each further picture in the sequence of decoded pictures. The more subsequent P-pictures are processed in this manner, the better the output picture will resemble the original object.

As will be appreciated, the invention offers the particular advantage that the motion vectors obtained in the encoding phase are also used in the still-picture creation phase. It is not necessary to have another motion estimator. Neither is a memory for each picture required. Furthermore, the motion vectors refer to the immediately preceding picture rather than to a fixed reference picture. Because motion between successive pictures is relatively small, the probability of obtaining motion vectors with half-pixel accuracy (which is essential for resolution doubling) is therefore considerably greater than in the prior art.

The invention also allows still pictures to be transmitted or stored as a sequence of compressed low-resolution pictures, which requires a moderate transmission or storage capacity. Widely available standard components (MPEG encoders and decoders) can be used, and the sequence of low-resolution pictures can optionally be reproduced in the form of motion video.

In summary, a method and arrangement is disclosed for creating a high-resolution still picture. A sequence of lower-resolution pictures is subjected to motion-compensated predictive encoding, preferably by an MPEG encoder producing an IPPP. sequence of encoded pictures. The relatively small differences between successive pictures, which are due to motion of the image sensor or motion in the scene, become manifest in motion vectors with sub-pixel accuracy. The high-resolution picture is then created from the decoded pictures and the motion vectors generated by the encoder.

The invention is particularly applicable in electronic still picture cameras with a storage medium. The MPEG encoder takes care of data compression, and the decoder also allows playback of the original moving video sequence.

What is claimed is:

1. A method of creating a high-resolution still picture, comprising the steps of:

receiving a sequence of lower-resolution pictures;

estimating motion in said sequence of lower-resolution pictures with sub-pixel accuracy; and creating the high-resolution still picture from said sequence of lower-resolution pictures and said estimated motion;

wherein the method comprises the steps of:

subjecting the sequence of pictures to motion-compensated predictive encoding, thereby generating motion vectors representing motion between successive pictures of said sequence;

decoding said encoded pictures; and creating the high-resolution picture from said decoded pictures and the motion vectors generated in said encoding step.

2. The method as claimed in claim 1, further comprising the step of storing the encoded pictures on a storage medium.

3. The method as claimed in claim 1, wherein the step of encoding the sequence of pictures comprises the use of an MPEG encoder which is arranged to produce a sequence of I and P-pictures.

4. The method as claimed in claim 1, wherein the creating step includes recursively adding, in the high-resolution domain, a current decoded picture to a previously created picture, said previously created picture being subjected to motion-compensation in accordance with the motion vector which is associated with the current decoded picture.

5. An arrangement for creating a high-resolution still picture, comprising:

means (1) for receiving a sequence of lower-resolution pictures;

means for estimating motion in said sequence of lower-resolution pictures with sub-pixel accuracy; and means (5) for creating the high-resolution still picture from said sequence of lower-resolution pictures and said motion vectors;

wherein the arrangement further comprises:

an encoder (2) for subjecting the sequence of pictures to motion-compensated predictive encoding, including a motion estimator (24) for generating motion vectors representing motion between successive pictures of said sequence;

a decoder (4) for decoding said encoded pictures;

the creating means (5) being arranged to create the high-resolution picture from said decoded pictures and the motion vectors generated by the encoder (2).

6. The arrangement as claimed in claim 5, further comprising a storage medium (3) for storing the encoded pictures.

7. An image recording and reproducing apparatus, comprising an arrangement as claimed in claim 6, and further comprising an image sensor (1) for obtaining the lower-resolution pictures.

8. The arrangement as claimed in claim 5, wherein the encoder (2) is an MPEG encoder which is arranged to produce a sequence of I and P-pictures.

9. The arrangement as claimed in claim 5, wherein the creating means include means (53,54) for recursively adding, in the high-resolution domain, a current decoded picture to a previously created picture, said previously created picture being subjected to motion compensation (55) in accordance with the motion vector which is associated with the current decoded picture.

10. An arrangement for creating a high-resolution still picture, comprising:

means for receiving a sequence of lower-resolution pictures in the form of motion-compensated predictively encoded pictures and motion vectors representing motion between successive pictures of said sequence;

a decoder (4) for decoding said encoded pictures; and means (5) for creating the high-resolution picture from said decoded pictures and the received motion vectors;

wherein the creating means include means (53,54) for recursively adding, in the high-resolution domain, a current decoded picture to a previously created picture, said previously created picture being subjected to motion compensation (55) in accordance with the motion vector which is associated with the current decoded picture.

* * * * *